US006879887B2

(12) United States Patent
Gaidelis, Jr. et al.

(10) Patent No.: US 6,879,887 B2
(45) Date of Patent: Apr. 12, 2005

(54) LOW SPEED RANGE INDICATOR

(75) Inventors: John A. Gaidelis, Jr., Glendale, AZ (US); Thomas G. Frazier, Scottsdale, AZ (US); Jary E. Engels, Peoria, AZ (US); Thomas M. Leard, Carefree, AZ (US); Clarence D. Nygaard, Glendale, AZ (US); Robert C. Odgers, Litchfield Park, AZ (US); David A. Tunheim, Scottsdale, AZ (US); Ivan S. Wyatt, Scottsdale, AZ (US)

(73) Assignee: Honeywell International Inc., Morristown, NJ (US)

( * ) Notice: Subject to any disclaimer, the term of this patent is extended or adjusted under 35 U.S.C. 154(b) by 12 days.

(21) Appl. No.: 10/406,692

(22) Filed: Apr. 2, 2003

(65) Prior Publication Data

US 2004/0210355 A1 Oct. 21, 2004

(51) Int. Cl.⁷ .................... G01C 21/00; G08B 23/00
(52) U.S. Cl. .................. 701/7; 701/3; 701/9; 340/969; 340/978; 73/170.02; 73/178 T
(58) Field of Search ............................. 701/3, 7, 8, 9, 701/14; 73/178 R, 178 T, 170.02; 340/945, 969, 978

(56) References Cited

U.S. PATENT DOCUMENTS

| | | | | |
|---|---|---|---|---|
| 2,922,982 A | * | 1/1960 | Hoekstra | 340/959 |
| 3,381,656 A | * | 5/1968 | Ohnikian et al. | 116/278 |
| 3,621,210 A | * | 11/1971 | Canning et al. | 340/961 |
| 3,863,204 A | * | 1/1975 | Hoekstra | 340/959 |
| 3,865,071 A | * | 2/1975 | Manor | 116/282 |
| 4,149,148 A | * | 4/1979 | Miller et al. | 345/27 |
| 4,247,843 A | * | 1/1981 | Miller et al. | 340/973 |
| 4,312,041 A | * | 1/1982 | DeJonge | 701/123 |
| 4,590,475 A | * | 5/1986 | Brown | 340/966 |
| 5,420,582 A | * | 5/1995 | Kubbat et al. | 340/974 |
| 5,739,771 A | * | 4/1998 | Fisher | 340/978 |
| 5,797,562 A | * | 8/1998 | Wyatt | 244/1 R |
| 5,978,715 A | * | 11/1999 | Briffe et al. | 701/11 |
| 6,028,536 A | * | 2/2000 | Voulgaris | 340/975 |
| 6,118,385 A | * | 9/2000 | Leard et al. | 340/688 |
| 6,154,151 A | * | 11/2000 | McElreath et al. | 340/970 |
| 6,381,519 B1 | * | 4/2002 | Snyder | 701/3 |
| 2003/0004619 A1 | * | 1/2003 | Carriker et al. | 701/3 |

* cited by examiner

Primary Examiner—Michael J. Zanelli
Assistant Examiner—Eric M. Gibson

(57) ABSTRACT

In an aircraft flight instrument display system having a display screen for displaying flight information, an airspeed indicator is displayed in a vertical tape format, and has a low speed range indicator with a low speed range identified on the airspeed indicator by highlighting the low speed range, and has at least a settable indicator within the low speed range indicating a critical airspeed. The low speed range indicator and the critical airspeed indicator are both set with only manual inputs.

18 Claims, 4 Drawing Sheets

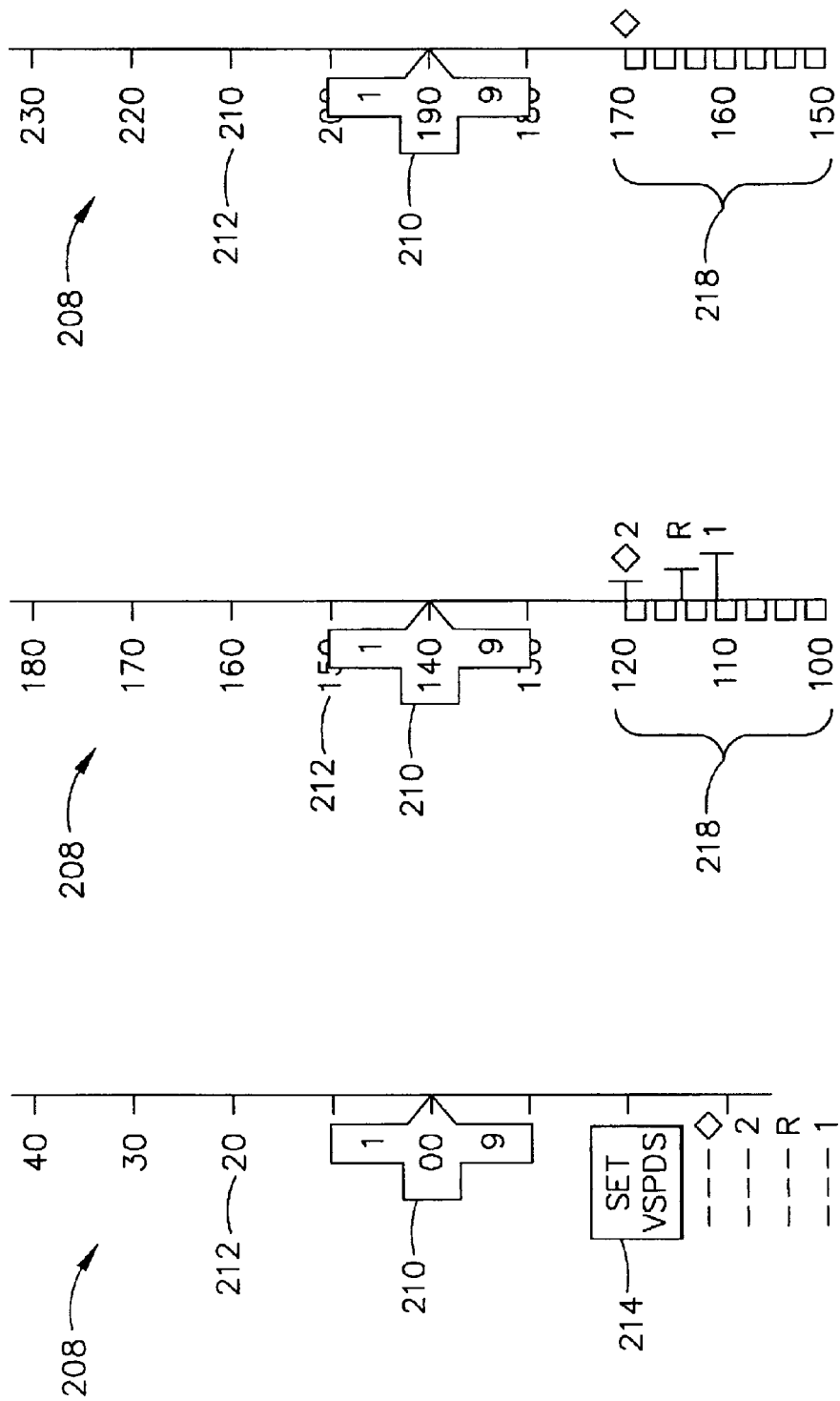

LOW SPEED RANGE INDICATOR

TECHNICAL FIELD

The present invention relates to a display for an aircraft, and more particularly to a method and apparatus for providing a low speed indication for an aircraft vertical tape airspeed indicator.

BACKGROUND OF THE INVENTION

Modern aircraft cockpit displays, particularly those used in aircraft for flight planning and monitoring, are capable of displaying a considerable amount of information such as flight planning information, flight profile information, airport information, airway information, navigational aid information, aircraft performance information, other aircraft information, and other information useful to a crew member in conducting or monitoring a flight.

With certain displays it is possible for a crew member to interact with the display by selecting a particular item of information on the display, and to enter certain information related to flight parameters into the display. Such information may be navigational information, communications information or information directly related to the performance characteristics of the aircraft such as various critical airspeeds and the like.

Airspeeds are particularly critical when the aircraft is in relatively slow flight, for example during takeoff or landing. At these times the pilot must be especially aware of the aircraft's airspeed because of the danger of inducing a stall. Airspeed indicators are generally of two types: older round dial airspeed indicators in which the airspeed is indicated with respect to a fixed scale around the instrument, and airspeed markers, or "bugs", and the angular orientation of the airspeed needle give some indication of low speed; and more modern vertical tape airspeed indicators in which the speed scale moves with respect to a fixed pointer in the center of the tape. Vertical tapes lack the angular presentation of round dial instruments. Consequently, airspeed bugs and low speed range indications are vital to low speed awareness. Providing airspeed bugs and low speed range indications is particularly difficult in those instances where an older aircraft is retrofitted with more modern instrumentation which includes a vertical tape airspeed indicator. Such aircraft may not, for example, have all the sensor inputs needed to provide the added airspeed bugs or low speed range indication noted above for display on a vertical tape airspeed indicator.

BRIEF SUMMARY OF THE INVENTION

The above deficiencies are addressed in the instant invention by providing in an aircraft flight instrument display system having a display screen for displaying flight information, an airspeed indicator displayed in a vertical tape format, and having a low speed range indicator with a low speed range identified on the airspeed indicator by highlighting the low speed range, and at least a settable indicator within the low speed range indicating a critical airspeed. The low speed range indicator and the critical airspeed indicator are both set only with manual inputs.

BRIEF DESCRIPTION OF THE DRAWINGS

The present invention will hereinafter be described in conjunction with the appended drawing figures, wherein like numerals denote like elements, and in which:

FIG. 3 is a representation of the vertical tape airspeed indicator portion of the display of FIG. 2 showing the display with a prompt to set the critical airspeeds into the system in preparation for takeoff.

FIG. 4 is a representation of the vertical tape airspeed indicator portion of the display of FIG. 2 showing the display with the critical airspeeds and the associated bugs set for takeoff.

FIG. 5 is a representation of the vertical tape airspeed indicator portion of the display of FIG. 2 after the aircraft has achieved cruise.

DETAILED DESCRIPTION OF A PREFERRED EMBODIMENT

Figure 1:
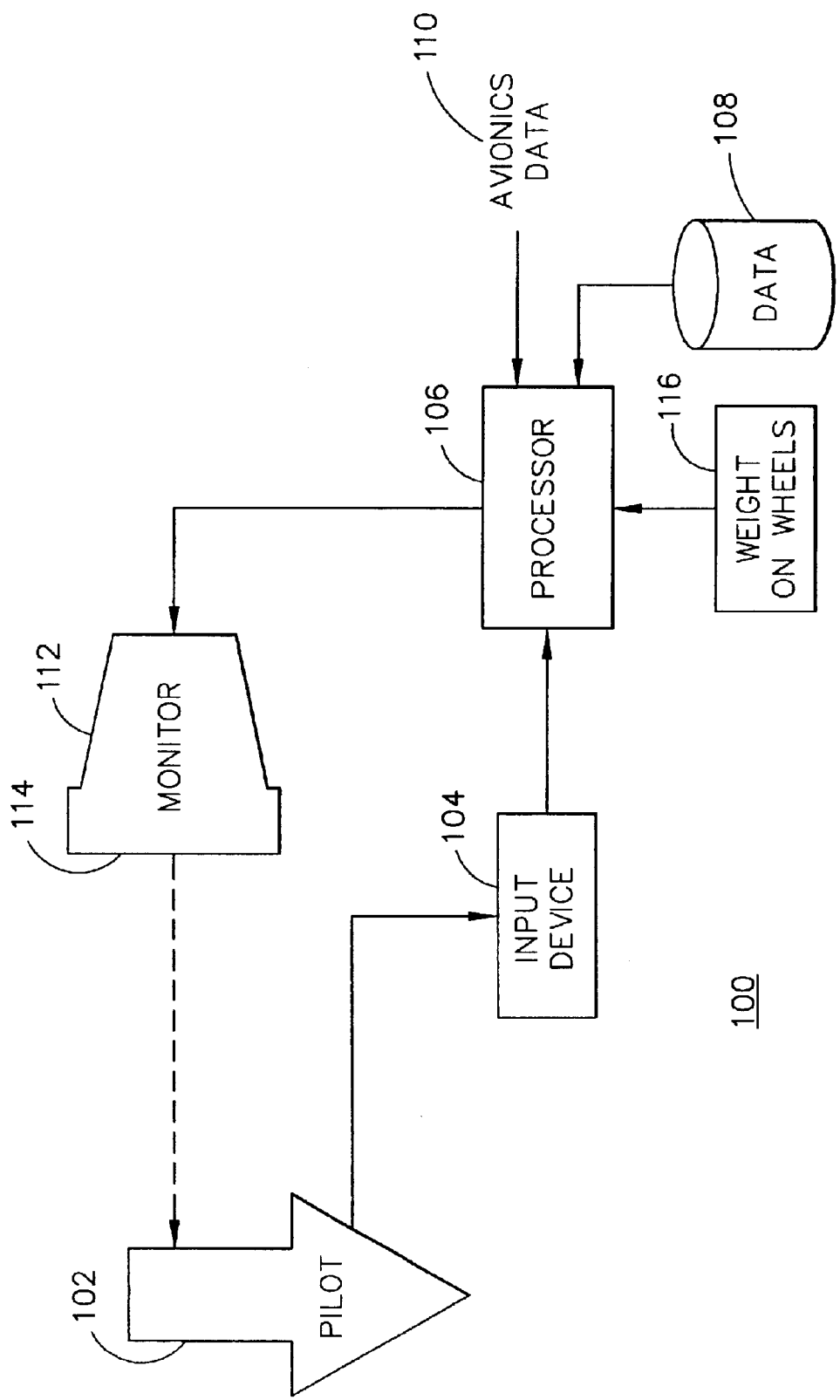
FIG. 1 is a block diagram of a display system usable with the instant invention.

The present invention may be described in terms of functional block diagrams and various processing steps. It should be appreciated that such functional blocks may be realized in many different forms of hardware, firmware, and/or software components configured to perform the various functions. For example, the present invention may employ various integrated circuit components, e.g., memory elements, digital signal processing elements, look-up tables, and the like, which may carry out a variety of functions under the control of one or more microprocessors or other control devices. Such general techniques are known to those skilled in the art and are not described in detail herein. Moreover, it should be understood that the exemplary process illustrated may include additional or fewer steps or may be performed in the context of a larger processing scheme. Furthermore, the various methods presented in the drawing Figures or the specification are not to be construed as limiting the order in which the individual processing steps may be performed.

It should be appreciated that the particular implementations shown and described herein are illustrative of the invention and its best mode and are not intended to otherwise limit the scope of the invention in any way.

In FIG. 1, an exemplary aircraft display system 100 includes a processor 106 configured to communicate with an input device 104 through which a pilot or crewmember 102 can provide inputs to the system. The input device may be, for example, a hand input device such as a mouse or a track-ball, a keyboard, or any device which allows a user to point to or select an item on the display or to enter data into the system. An associated monitor (or monitors) 112, one or more data sources 108, and avionics data 110 are coupled to the processor 106. In general, a user (e.g., a pilot 102) located within a vehicle (e.g., aircraft) (not shown) may provide input to processor 106 through input device 104 and receive visual feedback regarding the status of the aircraft via a display 114 produced by monitor 112. Aircraft display system 100 may be suitably configured for use in a commercial aircraft or any vehicle in which navigational aids, terrain information, weather information, and flight data, such as heading, altitude, airspeed, and the like. Since certain aircraft indicators may be sensitive to whether the aircraft is in flight or on the ground, an indicator of weight-on-wheels 116 is provided. The image generation and display aspects may leverage known techniques such that existing aircraft display systems can be modified in a straightforward manner to support the different features described herein. In a practical implementation, the concepts described herein may be realized in the form of revised display generation software or processing resident at processor 106.

Processor 106 encompasses one or more functions used to provide a flight management, navigational, and positional interface with the pilot, and input to monitor 112. Processor 106 may include or cooperate with a mode, position and/or detection element that is capable of determining the mode or position of the vehicle relative to one or more reference locations, points, planes, or navigation aids. In addition, processor 106 may be configured to receive, analyze, condition, and process navigation, flight, and positional information associated with the vehicle. In this regard, processor 106 may include any number of individual microprocessors, flight computers, navigation equipment, memories, storage devices, interface cards, and other standard components known in the art. Moreover, processor 106 may include any number of microprocessor elements, memory elements, power supplies, and other functional components as necessary to support the operation of aircraft display system 100. In this respect, processor 106 may include or cooperate with any number of software programs or instructions designed to carry out various methods, process tasks, calculations, control functions, and the generation of display signals and other data used by display element 114. For example, processor 106 may be configured to generate an annunciator associated with the position of the aircraft relative to at least one reference location, to generate windows corresponding to user inputs, and the like.

Monitor 112 may include any display 114 suitable for displaying the various symbols and information detailed below. Many currently known monitors are suitable for this task, including various CRT and flat-panel display systems. Monitor 112 may be based on a panel mounted display, a HUD projection, or any known technology. In an exemplary embodiment, monitor 112 includes a panel display 114. Display 114 suitably includes various graphical elements associated with the environment of the aircraft including graphical elements representing flight status through implementation of representations of flight instrumentation such as airspeed indicators, altimeters, directional indicators and the like.

Figure 2:
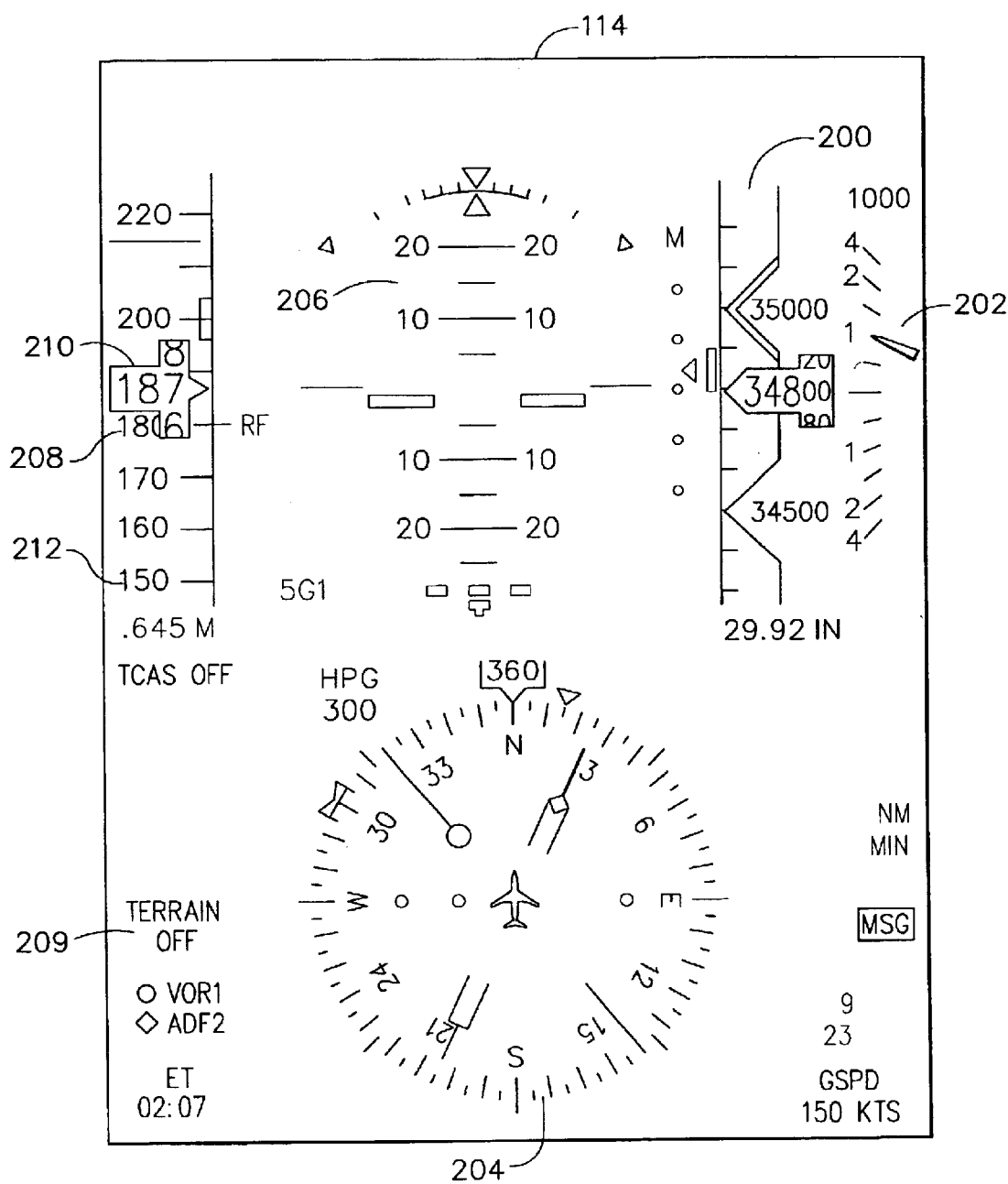
FIG. 2 is a representation of the display of FIG. 1 showing a typical mix of flight information which may appear on a display in an aircraft cockpit.

FIG. 2 is a representation of a display 114 showing a typical mix of information which may appear on a display in an aircraft cockpit. In the upper right corner of the display 114 is an altimeter 200, and a vertical airspeed indicator 202. In the lower center of the display is a compass rose 204 which may be driven by a magnetic compass or by a radio compass. In the upper center of the display is an aircraft attitude indicator 206. In the upper left portion of the display is a vertical tape airspeed indicator 208, which in the display as shown indicates an airspeed of 187 knots. The vertical tape airspeed indicator 208 includes a pointer 210 which remains stationary on the display while the numerical field 212 behind it has a representation of various airspeeds which travel upward or downward on the display depending upon the speed of the aircraft such that the present airspeed always appears under the pointer 210. From the representation of the vertical tape airspeed indicator 208 it can be seen that the vertical tape lacks the angular presentation of round dial instruments and thus, airspeed bugs and low speed range indications are not obviously shown. The addition of a low speed range band at and below the appropriate critical speed bugs would enhance this awareness.

There are various other representations on the display 114, including indicators such as "terrain off" 209 which indicates that the terrain is not being displayed at present, and other indicators not relevant to the instant invention.

FIG. 3 is a representation of the vertical tape airspeed indicator portion of the display of FIG. 2 showing the display with a prompt to set the critical airspeeds into the system in preparation for takeoff. The vertical tape airspeed indicator is shown generally at 208 and the airspeed pointer at 210. As in FIG. 2, the representation of the airspeed which moves relative to the pointer 210 is shown at 212. As the aircraft is being prepared for takeoff, the condition of the aircraft flights instruments, showing, for example, zero airspeed and weight-on-wheels, causes the display to depict in FIG. 3 a block 214 which indicates "SET VSPDS", prompting the pilot or crewmember to set the critical airspeeds into the flight data system. As previously noted, this may be done by means of a data entry device which acts interactively with display 114. The critical airspeeds generally are $V_1$, which is the go-no go speed below which an engine or system failure would cause the takeoff to be aborted, but above which the takeoff must be continued as there is insufficient runway remaining to slow and stop the aircraft; $V_R$, which is the speed at which the pilot rotates the aircraft to effect takeoff; $V_2$, which is the "best angle of climb" speed for the particular aircraft in its present configuration; and an additional speed, "clean speed", which may be set at a speed at or above the $V_2$, related to an aircraft's performance characteristics, for example, 50 knots above $V_2$, and which indicates that the aircraft is out of the low speed range where increased attention to and awareness of airspeed is necessary.

FIG. 4 is a representation of the vertical tape airspeed indicator portion of the display of FIG. 2 showing the display with the critical airspeeds and the associated bugs set for takeoff. The vertical tape airspeed indicator again is shown at 208. The pointer 210 and the airspeed markings 212 are also shown. In preparation for takeoff, the $V_1$, $V_R$, $V_2$, and clean speeds have all been set as indicated in the lower right portion of the display representation. In addition to the speed bugs having been set and indicated on the airspeed indicator, the airspeed indicator itself is enhanced by making the airspeed indications more pronounced either by widening or brightening them as shown by the low speed range band 218.

FIG. 5 is a representation of the vertical tape airspeed indicator portion of the display of FIG. 2 after the aircraft has achieved cruise. The vertical tape airspeed indicator is shown generally at 208, and the airspeed pointer at 210. As in FIG. 2, the representation of the airspeed which moves relative to the pointer 210 is shown at 212. Once a successful takeoff has occurred and the airspeed of the aircraft passes $V_2$+50 knots, the $V_1$, $V_R$, and $V_2$ bugs are removed from the display and the LSR display is moved to the diamond marker or bug, in this case at 170 knots. The margin of 50 knots above $V_2$ for setting of the clean speed is somewhat arbitrary and may be varied depending upon the particular aircraft for which the system is being designed. As mentioned above, the enhanced display of the low speed range is moved such that the upper end of the low speed range is now at the diamond marker, that is, the diamond marker defines the upper edge of the low speed range during cruise. At the same time, the SET VSPDS display is rearmed in preparation for landing. The $V_2+50$ knots value is stored to determine the trip point for displaying the SET VSPDS box for landing.

Figure 6:
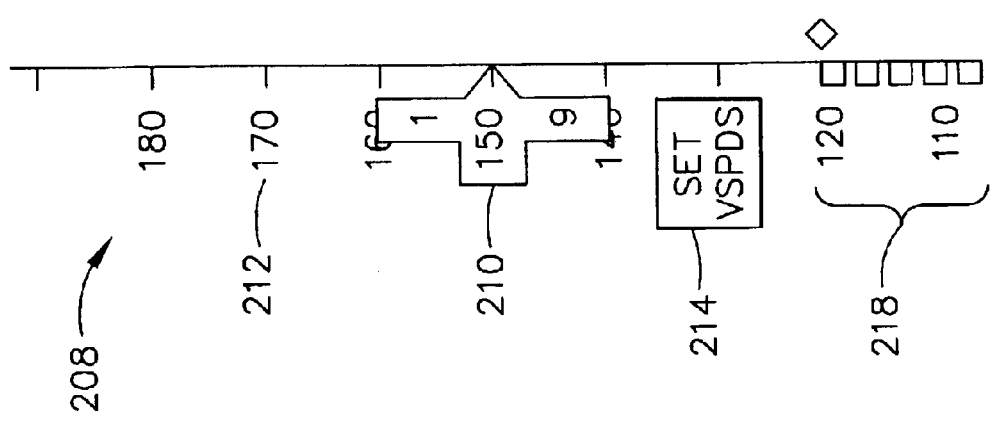
FIG. 6 is a representation of the vertical airspeed indicator portion of the display of FIG. 2 showing a prompt for the entry of critical airspeeds for the approach for landing of the aircraft.

FIG. 6 is a representation of the vertical speed indicator portion of the display of FIG. 2 showing a prompt for the entry of critical air speeds for the approach for landing of the aircraft. The vertical tape airspeed indicator is shown generally at 208, and the airspeed pointer at 210. As in FIG. 2, the representation of the airspeed which moves relative to the pointer 210 is shown at 212.

When the air speed indicates $V_2+50$ knots (where the diamond marker happens to be set in this example) or less, with the aircraft below 15,000 feet barometric altitude, the SET VSPDS box will appear, alerting the flight crew to set $V_{REF}$ (in this case, 120 knots). When $V_{REF}$ is set, the SET VSPDS box is removed, the diamond shaped bug is removed from its position, and the low speed range band is displayed at and below $V_{REF}$, which is now represented by the diamond shaped bug.

Figure 7:
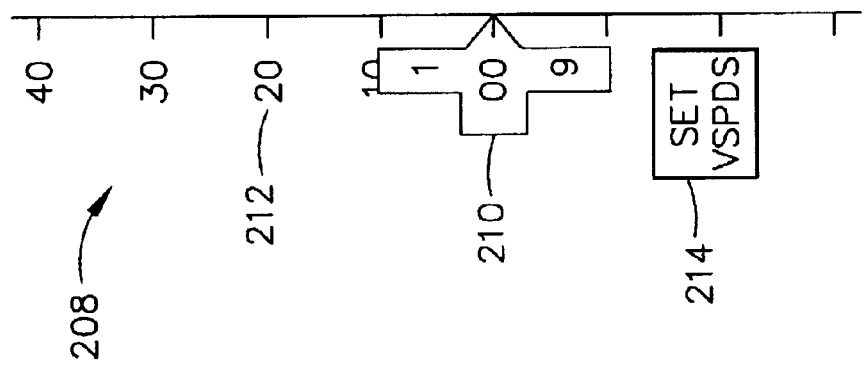
FIG. 7 is a representation of the vertical airspeed indicator portion of the display of FIG. 2 after the aircraft has landed.

FIG. 7 is a representation of vertical airspeed indicator portion of the display of FIG. 2 after the aircraft has landed. The vertical tape airspeed indicator is shown generally at 208, and the airspeed pointer at 210. As in FIG. 2, the representation of the airspeed which moves relative to the pointer 210 is shown at 212. After landing, with an indication of weight-on-wheels and the ground speed less than 40 knots, the RF (diamond shape) bug and the low speed range band are removed from the display and the SET VSPDS box is displayed.

While the invention has been described in terms related to the preferred embodiment disclosed herein, it will become apparent to those skilled in the art that modifications may be made which however remain within the scope of the appended claims.

What is claimed is:

1. In an aircraft flight instrument display system having a display screen for displaying flight information including an airspeed indicator, the airspeed indicator being displayed in a vertical tape format, a low speed range indicator comprising:

a low speed range identified on the airspeed indicator by highlighting the low speed range, at least a settable indicator within the low speed range indicating a critical airspeed; and a reminder indicator displayed on the air speed indicator when the settable indicator requires setting.

2. An aircraft flight instrument display system as set forth in claim 1 wherein the settable indicator establishes at least a portion of the low speed range.

3. An aircraft flight instrument display system as set forth in claim 1 wherein there are at least two settable indicators, both settable indicators being only manually settable via a keyboard.

4. An aircraft flight instrument display system as set forth in claim 1 wherein the low speed range is displayed as a function of the flight status of the aircraft.

5. An aircraft flight instrument display system as set forth in claim 1 wherein the low speed range is highlighted by the color of the low speed range.

6. An aircraft flight instrument display system as set forth in claim 1 wherein the low speed range is highlighted by varying the intensity of the low speed range display.

7. An aircraft flight instrument display system as set forth in claim 1 wherein a settable indicator defines a limit of the low speed range.

8. In an aircraft fight instrument display system having a display screen for displaying flight information including an airspeed indicator, the airspeed indicator being displayed in a vertical tape format, a method for indicating a low speed range on the airspeed indicator comprising:

identifying a low speed range on the airspeed indicator by highlighting the low speed range, displaying at least a settable indicator within the low speed range indicating a critical airspeed; and displaying a reminder indicator when the settable indicator requires setting.

9. A method for indicating a low speed range on the airspeed indicator as set forth in claim 8 wherein the settable indicator establishes at least a portion of the low speed range.

10. A method for indicating a low speed range on the airspeed indicator as set forth in claim 8 wherein there are at least two settable indicators, both settable indicators being only manually settable via a keyboard.

11. A method for indicating a low speed range on the airspeed indicator as set forth in claim 8 wherein the low speed range is displayed as a function of the flight status of the aircraft.

12. A method for indicating a low speed range on the airspeed indicator as set forth in claim 8 wherein the low speed range is highlighted by the color of the low speed range.

13. A method for indicating a low speed range on the airspeed indicator as set forth in claim 8 wherein the low speed range is highlighted by varying the intensity of the low speed range display.

14. A method for indicating a low speed range on the airspeed indicator as set forth in claim 8 wherein a settable indicator defines a limit of the low speed range.

15. In an aircraft flight instrument display system having a display screen for displaying flight information including an airspeed indicator, the airspeed indicator being displayed in a vertical tape format and having a plurality of settable indicators for indicating critical speeds, a low speed range indicator comprising:

at least one of the settable indicators within the low speed range indicating in a first mode, the top of the low speed range, and in a second mode a speed above the top of the low speed range; and a reminder indicator indicating when at least one of the settable indicators needs to be set.

16. A low speed range indicator as set forth in claim 15 wherein the low speed range is highlighted.

17. A low speed range indicator as set forth in claim 15 wherein the first mode and second mode are automatically selected as a function of the flight status of the aircraft.

18. A low speed indicator as set forth in claim 15 wherein there are at least two settable indicators, the two settable indicators being only manually settable via a keyboard.

* * * * *